(12) United States Patent
Kaku (10) Patent No.: US 11,541,780 B2
(45) Date of Patent: Jan. 3, 2023

(54) PHYSICAL STATE SHARABLE SEAT

(71) Applicant: TS TECH CO., LTD., Asaka (JP)

(72) Inventor: Hiroyuki Kaku, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 329 days.

(21) Appl. No.: 16/757,269

(22) PCT Filed: Oct. 5, 2018

(86) PCT No.: PCT/JP2018/037326
§ 371 (c)(1),
(2) Date: Apr. 17, 2020

(87) PCT Pub. No.: WO2019/078031
PCT Pub. Date: Apr. 25, 2019

(65) Prior Publication Data
US 2021/0188131 A1 Jun. 24, 2021

(30) Foreign Application Priority Data
Oct. 20, 2017 (JP) .............................. JP2017-203355

(51) Int. Cl.
*B60N 2/02* (2006.01)
*B60N 2/00* (2006.01)
(Continued)

(52) U.S. Cl.
CPC .............. *B60N 2/002* (2013.01); *B60K 35/00* (2013.01); *B60K 37/06* (2013.01);
(Continued)

(58) Field of Classification Search
CPC ...... B60N 2/002; B60N 2/0244; B60R 21/015
See application file for complete search history.

(56) References Cited

U.S. PATENT DOCUMENTS 9,223,936 B2 12/2015 Aragones et al.
9,283,429 B2 3/2016 Aragones et al.
(Continued)

FOREIGN PATENT DOCUMENTS

JP H11064131 3/1999
JP 2015184975 10/2015
(Continued)

OTHER PUBLICATIONS

Office Action issued for Chinese Patent Application No. 201880068050.X, dated Oct. 25, 2021, 13 pages including English translation.
(Continued)

*Primary Examiner* — Syed A Islam
(74) *Attorney, Agent, or Firm* — Hamre, Schumann, Mueller & Larson, P.C.

(57) ABSTRACT

In a physical state sharable seat, a sensor is configured to acquire a measurement value specific to a physical state of an occupant seated on the seat body; and a controller connected to the sensor and thereby allowed to acquire the measurement value from the sensor is configured to be capable of communicating with other equipment. The controller includes: an evaluation unit configured to compute an evaluation value on the physical state, based on the measurement value; an evaluation value presentation unit configured to present the evaluation value at a terminal to be used by the occupant; a shared data acquisition unit configured to acquire an other-occupant evaluation value that is an evaluation value on a physical state of another person, acquired either by the evaluation unit or from another physical state sharable seat; and a shared data presentation unit configured to present the other-occupant evaluation value at the terminal.

9 Claims, 11 Drawing Sheets

(51) Int. Cl.
  *B60K 35/00* (2006.01)
  *B60N 2/90* (2018.01)
  *B60K 37/06* (2006.01)
  *B60R 16/037* (2006.01)
  *B60R 21/015* (2006.01)

(52) U.S. Cl.
  CPC .... *B60K 2370/52* (2019.05); *B60K 2370/739* (2019.05); *B60N 2/0244* (2013.01); *B60N 2/90* (2018.02); *B60N 2002/0268* (2013.01); *B60R 16/037* (2013.01); *B60R 21/015* (2013.01)

(56) References Cited

U.S. PATENT DOCUMENTS

| | | | |
|---|---|---|---|
| 9,289,674 B2 | 3/2016 | Winsper et al. | |
| 9,358,426 B2 | 6/2016 | Aragones et al. | |
| 9,457,256 B2 | 10/2016 | Aragones et al. | |
| 9,505,305 B2 | 11/2016 | Tsuyunashi et al. | |
| 9,650,052 B2 | 5/2017 | Takahashi et al. | |
| 9,811,639 B2 | 11/2017 | Aragones et al. | |
| 9,852,271 B2 | 12/2017 | Aragones et al. | |
| 9,977,874 B2 | 5/2018 | Aragones et al. | |
| 10,420,982 B2 | 9/2019 | Aragones et al. | |
| 10,583,328 B2 | 3/2020 | Aragones et al. | |
| 10,967,758 B2 | 4/2021 | Mizoi | |
| 2012/0086249 A1* | 4/2012 | Hotary | B60N 2/20 297/284.3 |
| 2014/0195272 A1 | 7/2014 | Sadiq et al. | |
| 2014/0306814 A1 | 10/2014 | Ricci | |
| 2015/0274178 A1 | 10/2015 | Tsuyunashi et al. | |
| 2016/0288797 A1 | 10/2016 | Takahashi et al. | |
| 2018/0304774 A1 | 10/2018 | Mizoi | |
| 2021/0221259 A1 | 7/2021 | Mizoi | |

FOREIGN PATENT DOCUMENTS

| | | |
|---|---|---|
| JP | 2016120297 | 7/2016 |
| JP | 2016197308 | 11/2016 |
| JP | 2017081194 | 5/2017 |
| WO | 2012071551 | 5/2012 |
| WO | 2012082782 | 6/2012 |
| WO | 2017069235 | 4/2017 |

OTHER PUBLICATIONS

International Search Report and Written Opinion issued for International Patent Application No. PCT/JP2018/037326, dated Dec. 4, 2018, 14 pages including English translation.

Office Action issued for Japanese Patent Application No. 2017-203355, dated May 11, 2021, 9 pages including English translation.

Extended European Search Report issued for European Patent Application No. 18867993.0, dated Nov. 27, 2020, 9 pages.

Office Action issued for Japanese Patent Application No. 2017-203355, dated Dec. 7, 2021, 11 pages including English translation.

First Examination Report (Communication pursuant to Article 94(3) EPC) issued for European Patent Application No. 18867993.0, dated Jul. 25, 2022, 5 pages.

* cited by examiner

PHYSICAL STATE SHARABLE SEAT

TECHNICAL FIELD

The present invention relates to a seat capable of evaluating a physical state of a seated person.

BACKGROUND ART

An apparatus having a pressure sensor or the like provided in a driver's seat to evaluate a posture of a seated person is hitherto known in the art (see JP H11-064131 A).

SUMMARY OF INVENTION

However, merely presenting the results of evaluation made on the posture of the seated driver as disclosed in such a known apparatus would not make the seated person very well motivated to use its features, of which full exploitation would thus be an issue to be addressed.

It would be desirable that a seat capable of evaluating a physical state of a seated person be made more effective in enhancing his/her motivation to use the features of evaluating the physical state.

Against this backdrop, a physical state sharable seat is proposed which comprises: a seat body; a sensor configured to acquire a measurement value specific to a physical state of an occupant seated on the seat body; and a controller connected to the sensor and thereby allowed to acquire the measurement value from the sensor, the controller being configured to be capable of communicating with other equipment. In this seat, the controller comprises: an evaluation unit configured to compute an evaluation value on the physical state, the evaluation value being computed based on the measurement value; an evaluation value presentation unit configured to present the evaluation value at a terminal to be used by the occupant; a shared data acquisition unit configured to acquire an other-occupant evaluation value that is an evaluation value on a physical state of another person, acquired either by the evaluation unit or from another physical state sharable seat; and a shared data presentation unit configured to present the other-occupant evaluation value at the terminal to be used by the occupant.

With the seat configured as described above, not only is presented the evaluation value appraised on the physical state of the occupant, but also is presented the other-occupant evaluation value that is an evaluation value on the physical state of another person, at the terminal to be used by the occupant; therefore, having been informed, for example, of the other-occupant evaluation value or of the possibility that his/her own evaluation value would be made known to others, motivation for improving the evaluation value, presumably, can be summoned up. In addition, sharing of evaluation values with others should be of fun. Accordingly, the motivation to use the features of evaluating the physical state can be enhanced.

In the above-described seat, the controller may further comprise: a target value presentation unit configured to present a target value for the evaluation value at the terminal to be used by the occupant; and a performance level computation unit configured to compute a level of performance with respect to the target value based upon an evaluation value computed by the evaluation unit before presentation of the target value and an evaluation value computed by the evaluation unit after presentation of the target value. With these features, the shared data acquisition unit may be configured to acquire an other-occupant performance level that is a performance level of another person, acquired either by the performance level computation unit or from another physical state sharable seat, and the shared data presentation unit may be configured to present the other-occupant performance level instead of the other-occupant evaluation value, or present the other-occupant evaluation value and the other-occupant performance level, at the terminal to be used by the occupant.

With the seat configured as described above, not only is presented the level of performance with respect to the target value for the physical state of the occupant, but also is presented the other-occupant performance level that is a performance level with respect to the target value for the physical state of another person, at the terminal to be used by the occupant; therefore, having been informed, for example, of the other-occupant performance level or of the possibility that his/her own level of performance would be let be known to others, motivation for improving the level of his/her performance, presumably, can be summoned up. In addition, sharing of performance levels with others should be of fun. Accordingly, the motivation to use the features of evaluating the physical state can be enhanced.

In the above-described seat, the shared data presentation unit may be configured to present the other-occupant evaluation value, before the target value presentation unit presenting the target value, at the terminal to be used by the occupant.

The shared data presentation unit may be configured to present the other-occupant evaluation value, after the performance level computation unit computing the level of performance, at the terminal to be used by the occupant.

The shared data presentation unit may be configured to present the other-occupant evaluation value at the terminal to be used by the occupant during measurement made by the sensor to acquire the measurement value of the occupant and computation of the evaluation value performed by the evaluation unit.

The shared data presentation unit may be configured to present the other-occupant evaluation value at the terminal to be used by the occupant during a current evaluation value being presented at the terminal to be used by the occupant.

In the above-described seat, the controller may comprise an advice presentation unit configured to acquire, and present at the terminal to be used by the occupant, advice about how to increase the evaluation value, the advice being determined based on the evaluation value.

With the seat configured as described above, the occupant can pleasurably get absorbed in increasing the evaluation value on the physical state by making reference to the advice presented at the terminal.

In the above-described seat, the controller may preferably be configured to cause the evaluation value presentation unit and the shared data presentation unit to present the evaluation value and the other-occupant evaluation value in an easy-to-compare manner at the terminal to be used by the occupant.

With the seat configured as described above, the evaluation value and the other-occupant evaluation value are provided in an easy-to-compare representation at the terminal to be used by the occupant, so that the occupant's motivation can be further enhanced.

In the above-described seat, the seat body may be installable in a car. In this situation, the shared data acquisition unit may be configured to acquire the other-occupant evaluation value from a physical state sharable seat installed in another car.

With the seat configured as described above, the occupant's motivation can be further enhanced by presentation, given at the terminal to be used by the occupant, of the other-occupant evaluation value acquired from the other physical state sharable seat(s) which would be installed in any other car.

Where the seat body is installed in a car, the shared data acquisition unit may be configured to acquire a mean value of the evaluation and other-occupant evaluation values of a plurality of physical state sharable seats in the car, and the shared data presentation unit may be configured to present the mean value at the terminal to be used by the occupant.

With this configuration, the occupant can be further motivated by being informed of the mean value of the evaluation and other-occupant evaluation values.

DESCRIPTION OF EMBODIMENTS

Hereinafter, a detailed description will be given of one specific embodiment with reference made to accompanying drawings where appropriate.

Figure 1:
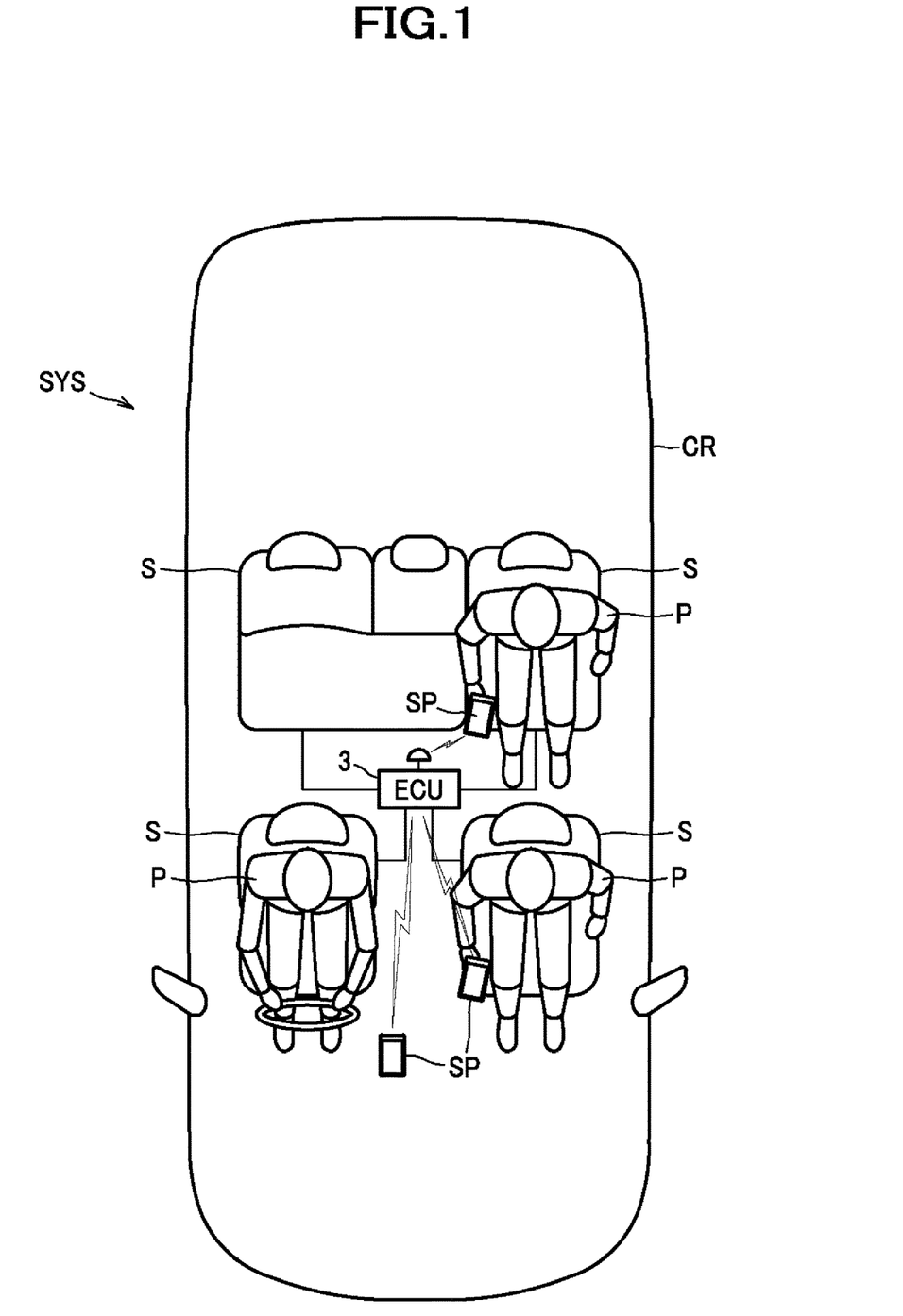
FIG. 1 is a diagram for explaining a general configuration of a system using physical state sharable seats according to one embodiment.

As shown in FIG. 1, a physical state sharable seat S is configured as a car seat to be installed in a car CR by way of example. The car CR is provided with two front seats and two rear seats; each of these four seats is configured as a physical state sharable seat S. The car CR adopts an ECU (electronic control unit) 3 which gathers information together from among the four physical state sharable seats S, causes them to operate in concert with one another, and relays a communication between a smartphone SP as an example of a terminal to be used by each occupant P and a corresponding physical state sharable seat S. The ECU 3 and each physical state sharable seat S are connected by a communication line.

To sum up, the car CR comprises ECU 3 and a plurality of physical state sharable seats S which constitute a system SYS using the physical state sharable seats S.

Figure 2:
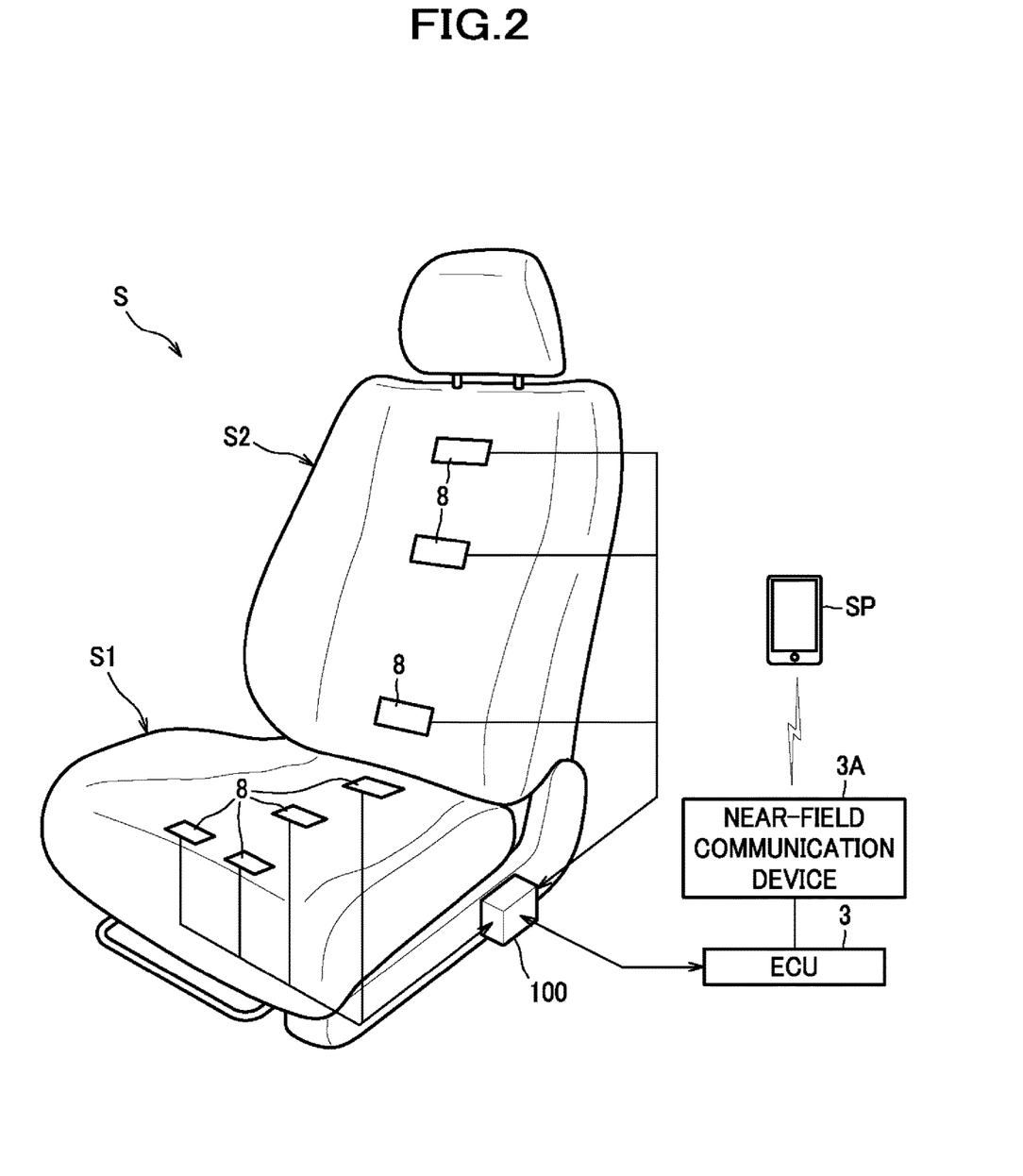
FIG. 2 is a diagram for explaining a configuration of each physical state sharable seat.

As shown in FIG. 2, the physical state sharable seat S includes a seat S1 and a seat back S2 which constitute a seat body. A plurality of pressure sensors 8 are provided under outer coverings of the seat cushion S1 and the seat back S2. Each pressure sensor 8 is an example of a sensor configured to acquire a measurement value specific to a physical state of an occupant P seated on the seat body.

Provided at an appropriate position on the seat cushion S1 is a controller 100. The controller 100 is connected to the pressure sensors 8 to thereby be made able to acquire the measurement values from the pressure sensors 8. The controller 100 is connected to the ECU 3 by a communication line.

The ECU 3 is provided with a near-field communications device 3A which enables a near-field communication, such as BLUETOOTH® (registered trademark; a wireless technology to share data between electronics devices), WI-FI® (registered trademark; wireless networking technologies), etc. The controller 100 is capable of communicating with a controller 100 of another physical state sharable seat S, as an example of other equipment, through the ECU 3.

Figure 3:
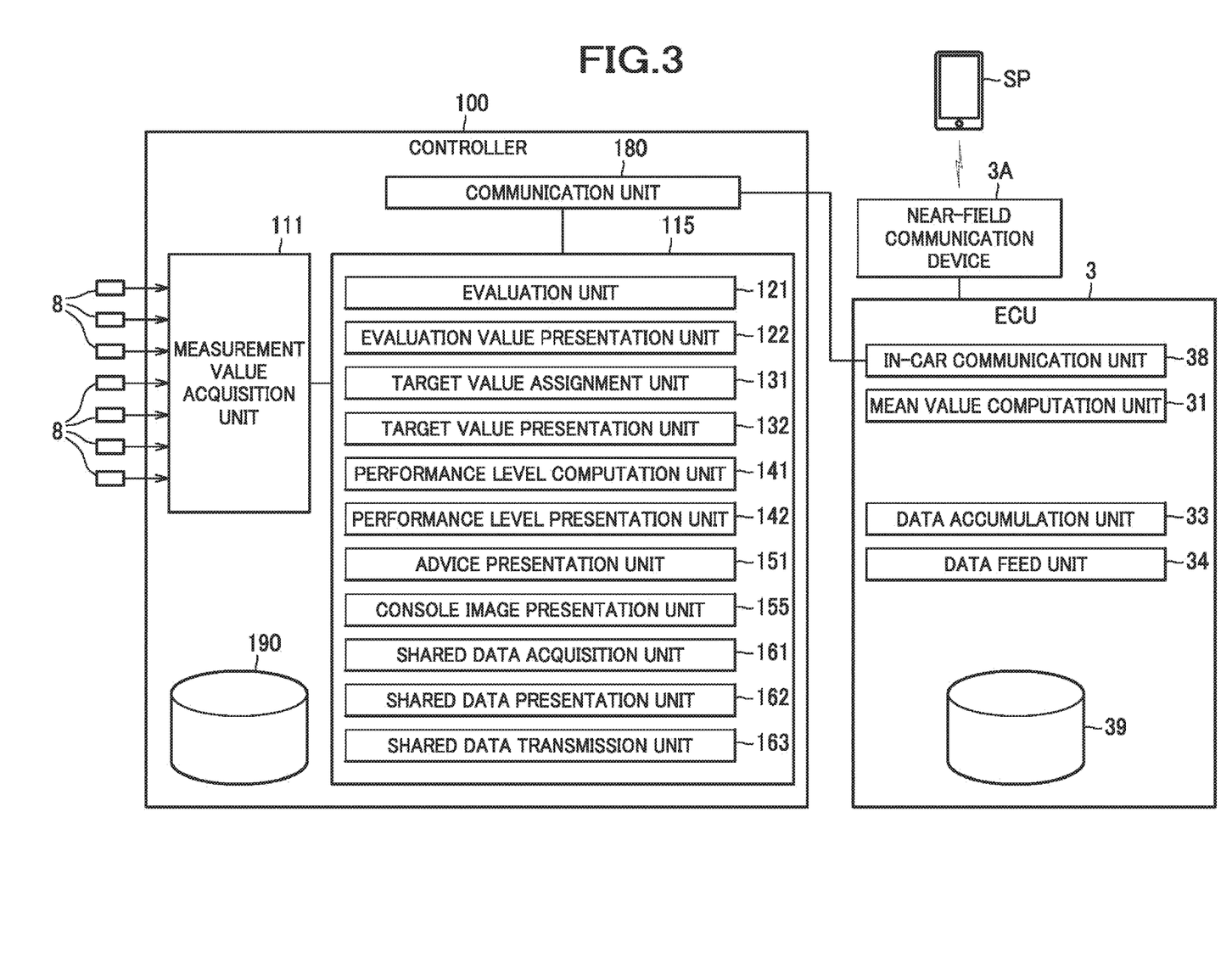
FIG. 3 is a block diagram for explaining a physical state sharable seat and system configuration.

As shown in FIG. 3, the controller 100 comprises a measurement value acquisition unit 111, a processing unit 115, a communication unit 180, and a storage unit 190. The controller 100 includes a CPU, a ROM, RAM, a rewritable nonvolatile memory, etc.; each functional unit is implemented through execution of pre-stored programs.

Figure 7:
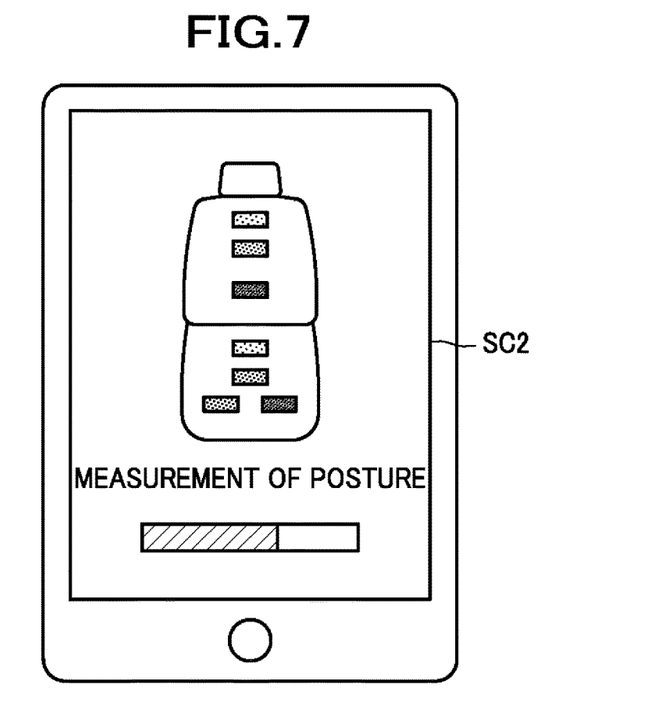
FIG. 7 is a measurement-in-progress screen.

The measurement value acquisition unit 111 has a function of acquiring measurement values of pressure at every predetermined control cycle from the plurality of pressure sensors 8. The measurement values acquired by the measurement value acquisition unit 111 is stored in the storage unit 190 and used in the processing unit 115. The measurement value acquisition unit 111 also has a function of presenting at a smartphone SP an image showing that measurement is currently in progress. The measurement-in-progress image is formed, for example, based upon a difference between a measurement value acquired by each sensor 8 and an ideal pressure value set for that pressure sensor 8, which difference is represented characteristically in color and displayed in a position corresponding to that pressure sensor 8 as shown in FIG. 7. For example, a region having an ideal pressure value measured may be represented in green, a region where the measurement value is smaller than the ideal pressure value may be represented in a red-hue color, and a region where the measurement value is greater than the ideal pressure value may be represented in a blue-hue color.

Turning back to FIG. 3, the processing unit 115 comprises an evaluation unit 121, an evaluation value presentation unit 122, a target value assignment unit 131, a target value presentation unit 132, a performance level computation unit 141, a performance level presentation unit 142, an advice presentation unit 151, a console image presentation unit 155, a shared data acquisition unit 161, a shared data presentation unit 162, and a shared data transmission unit 163.

The evaluation unit 121 has a function of computing an evaluation value on a physical state of an occupant P based on measurement values acquired through measurement made by the pressure sensors 8. Computation of an evaluation value on the physical state of an occupant P may be performed by any method desirable. The evaluation unit 121 is configured to have its computed evaluation value stored in the storage unit 190 as appropriate. It is to be understood that values acquired, computed or assigned, etc. are stored in the storage unit 190 as appropriate; thus, in the following description, an explanation of such storing steps will be omitted where deemed appropriate.

The physical state of an occupant is herein exemplified by, but not limited to, a posture of a seated occupant, by way of example. The physical state may include, for example: a state of physical motion of a seated occupant of which determination is based on measurement made by the pressure sensors 8; a state of stress or drowsiness of which determination is based on the heart rate; a state related to a cardiovascular disease; a state of figure and pose; a state or condition of health of which determination is based on the body temperature; and others.

To evaluate the posture of a seated occupant, which will be described later, for example, a balanced distribution of pressures (values acquired by the pressure sensors 8 varying relative to one another) exerted on the respective pressure sensors 8 when an ideal posture is assumed is stored in the storage unit 190 in advance. Then, the difference between the measurement value (of pressure) acquired through measurement made by each pressure sensor 8 and the pressure expected to be exerted thereon when an ideal posture is assumed is determined, and the sum of the differences is subtracted from a predetermined value (e.g., 100) to obtain an evaluation value. In short, evaluations thus performed may be such that a score of 100 is given if the distribution of pressures exerted on the respective pressure sensors 8 is ideally balanced.

The evaluation value presentation unit 122 has a function of presenting an evaluation value computed by the evaluation unit 121, at a smartphone SP that is a terminal to be used by an occupant P. Hereupon, data of the evaluation value is transmitted to the smartphone SP so that the evaluation value can be displayed on the screen of the smartphone SP, according to one exemplary embodiment.

In this description, the term "present(ing)" not only refers to displaying of texts and/or images on the screen such as a liquid crystal display, but may include presentation in any occupant-recognizable manner without limitation. For example, such presentation may be made by voice, and/or may be made by braille characters, if the terminal is a device configured to display the braille characters.

The target value assignment unit 131 has a function of assigning a target value for the evaluation value of an occupant P. The target value assignment unit 131 may be configured to assign, as a target value, for example, a value increased by a specific percent from a current evaluation value of the occupant P. Furthermore, an upper limit (e.g., 100) may be set to the target value to be assigned.

The target value presentation unit 132 has a function of presenting, at the smartphone SP, a target value for the evaluation value assigned by the target value assignment unit 131.

The performance level computation unit 141 has a function of computing a level of performance with respect to the target value based upon an evaluation value computed by the evaluation unit 121 before presentation of the target value and an evaluation value computed by the evaluation unit 121 after presentation of the target value. For example, the evaluation value computed by the evaluation unit 121 after presentation of the target value may be divided by the evaluation value computed by the evaluation unit 121 before presentation of the target value, so as to obtain the level of performance.

The performance level presentation unit 142 has a function of presenting, at the smartphone SP, the level of performance computed by the performance level computation unit 141.

The advice presentation unit 151 has a function of acquiring, and presenting at the smartphone SP, advice about how to increase the evaluation value, which advice is determined based upon the evaluation value. Pieces of such advice may be stored in advance, in a tabular form with advisory words (data) associated with the corresponding evaluation values, in the storage unit 190. Besides the evaluation values, the advisory words, associated with the corresponding pressure distribution balances of the pressure sensors 8, may be stored therein. The timing of presentation of the advice may be determined appropriately without limitation.

The console image presentation unit 155 has a function of presenting, at the smartphone SP, a console image including function selection buttons for making physical-state measuring and sharing functions available.

The shared data acquisition unit 161 has a function of acquiring an other-occupant evaluation value that is an evaluation value on a physical state of another occupant (a person previously seated in that physical sharable seat S or a person currently seated in another physical state sharable seat S), and an other-occupant performance level that is a performance level of another occupant.

The other-occupant evaluation value acquired by the shared data acquisition unit 161 may be one obtained from the evaluation unit 121 of that physical state sharable seat S, or one obtained from another physical state sharable seat S. When the other-occupant evaluation value is one obtained from the evaluation unit 121 of that physical state sharable seat S, the shared data acquisition unit 161 may acquire the same from the storage unit 190. When the other-occupant evaluation value is one obtained from another physical state sharable seat S, the shared data acquisition unit 161 may acquire the same through the ECU 3.

The other-occupant performance level acquired by the shared data acquisition unit 161 may be one obtained from the performance level computation unit 141 of that physical state sharable seat S, or one obtained from another physical state sharable seat S. When the other-occupant performance level is one obtained from the performance level computation unit 141 of that physical state sharable seat S, the shared data acquisition unit 161 may acquire the same from the storage unit 190. When the other-occupant performance level is one obtained from another physical state sharable seat S, the shared data acquisition unit 161 may acquire the same through the ECU 3.

The shared data acquisition unit 161 also has a function of acquiring a mean value of the evaluation and other-occupant evaluation values of a plurality of physical state sharable seats S in the car CR. In this embodiment, the mean value of the evaluation and other-occupant evaluation values is stored in the ECU 3, and the shared data acquisition unit 161 is configured to acquire the mean value from the ECU 3. It is thus to be understood that the mean value of the evaluation and other-occupant evaluation values is a mean value of the evaluation values computed in a plurality of physical state sharable seats S in the car CR which are connected to the ECU 3. This mean value may be a mean value of all the evaluation values of occupants P currently seated in the car CR, or may be a mean value of all the evaluation values hitherto computed in a plurality of physical state sharable seats S in the car CR. In this embodiment, by way of example, the mean value refers to a mean value of all the evaluation values of occupants P currently seated in the car CR.

The shared data presentation unit 162 has a function of presenting the other-occupant evaluation value(s) and/or the other-occupant performance level(s) at the smartphone SP to be used by the occupant P. In this embodiment, the shared data presentation unit 162 is configured to present both of the other-occupant evaluation value(s) and the other-occupant performance level(s) at the smartphone SP.

The shared data presentation unit 162 has a function of presenting a mean value of the evaluation and other-occupant evaluation values at the smartphone SP.

Moreover, the shared data presentation unit 162 is configured to present the other-occupant evaluation value(s), before the target value presentation unit 132 presenting a target value, at the smartphone SP to be used by the occupant P.

The shared data presentation unit 162 is also configured to present, at the smartphone SP to be used by the occupant P, the other-occupant evaluation value(s) after the performance level computation unit 141 computing the level of performance.

The shared data presentation unit 162 is further configured to present the other-occupant evaluation value(s) at the smartphone SP to be used by the occupant P during measurement made by the pressure sensors 8 to acquire the measurement values and computation of the evaluation value performed by the evaluation unit 121.

The shared data presentation unit 162 is further configured to present the other-occupant evaluation value(s) at the smartphone SP to be used by the occupant P during a current evaluation value being presented at the smartphone SP to be used by the occupant P. At this time, the shared data presentation unit 162 and the shared data presentation unit 122 are configured to operate in coordination with each other and present the evaluation value and the other-occupant evaluation value(s) in an easy-to-compare manner at the smartphone SP to be used by the occupant P.

The manner in which the evaluation value and the other-occupant evaluation value(s) are presented for ready comparison may be chosen from any method without limitation. To give an example, the evaluation value and the other-occupant evaluation value(s) may be so arranged side by side on one and the same screen as to be displayed in an easy-to-compare manner. Alternatively, a graph showing time-varying evaluation values and graph(s) showing time-varying other-occupant evaluation values may be superposed on one another for reference.

The shared data transmission unit 163 has a function of transmitting data obtained in the physical state sharable seat S, e.g., measurement values, evaluation values, target values, performance levels, etc., to the ECU 3. This enables sharing of such data among a plurality of physical state sharable seats S, through the ECU 3.

The communication unit 180 has a function of communicating with other equipment.

The storage unit 190 has a function of storing data necessary to perform computations and processing, where appropriate.

On the other hand, the ECU 3 includes a mean value computation unit 31, a data accumulation unit 33, a data feed unit 34, an in-car communication unit 38, and a storage unit 39.

The mean value computation unit 31 has a function of computing a mean value of all evaluation values computed in a plurality of physical state sharable seats S in the car CR, which seats S are connected to the ECU 3.

The data accumulation unit 33 has a function of accumulating, in the storage unit 39, pieces of data transmitted from respective physical state sharable seats S.

The data feed unit 34 has a function of transmitting data stored in the storage unit 39, in response to a request issued from each physical state sharable seat S, to the corresponding physical state sharable seat S.

The in-car communication unit 38 has a function of communicating with a plurality of physical state sharable seats S connected to the ECU 3 in the car CR. The ECU 3 is configured to communicate with the controller 100 through the in-car communication unit 38.

The ECU 3 serves as an intermediary through which communications between the controller 100 and the smartphone SP are established by means of the near-field communications device 3A; for example, instructions from the controller 100 to present various types of data are transmitted to the smartphone SP, and control signals from the smartphone SP are transmitted to the controller 100, therethrough.

The storage unit 39 has a function of storing data acquired from each of the physical state sharable seats S, mean values computed by the mean value computation unit 31, and so on.

An application (app) compatible with the physical state sharable seat S is installed in the smartphone SP. This application is configured to cause a screen to be displayed in accordance with an instruction given by the physical state sharable seat S to present specific data. The smartphone SP is configured to provide a selection screen on which functions executable in the physical state sharable seat S are made available, in response to instructions given by the controller 100.

An example of a process exercised by the controller 100 described above and an example of a transition of screens of the smartphone SP will be described with reference to FIG. 4 to FIG. 12.

Figure 4:
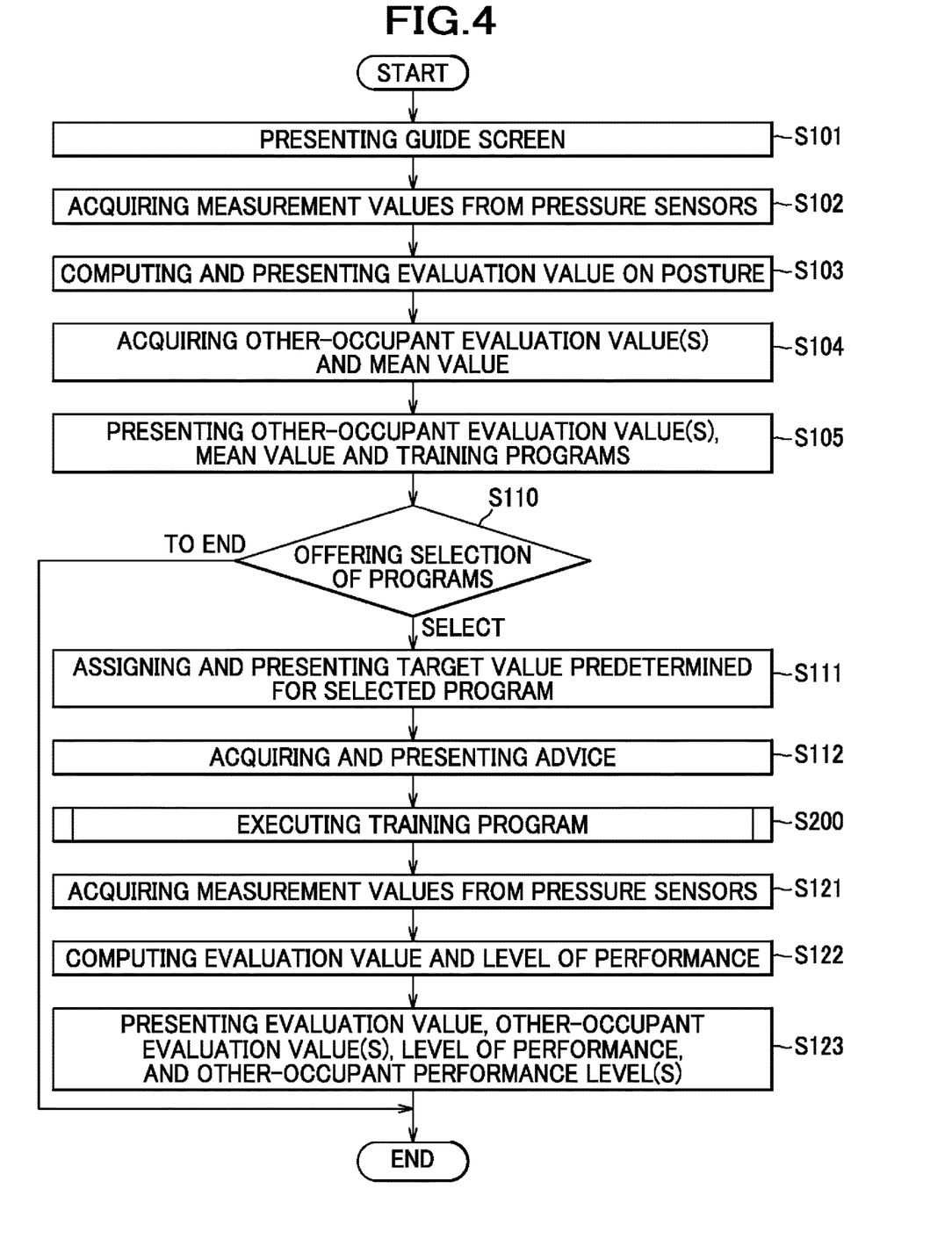
FIG. 4 is a flowchart showing an example of a process of a controller.
Figure 6:
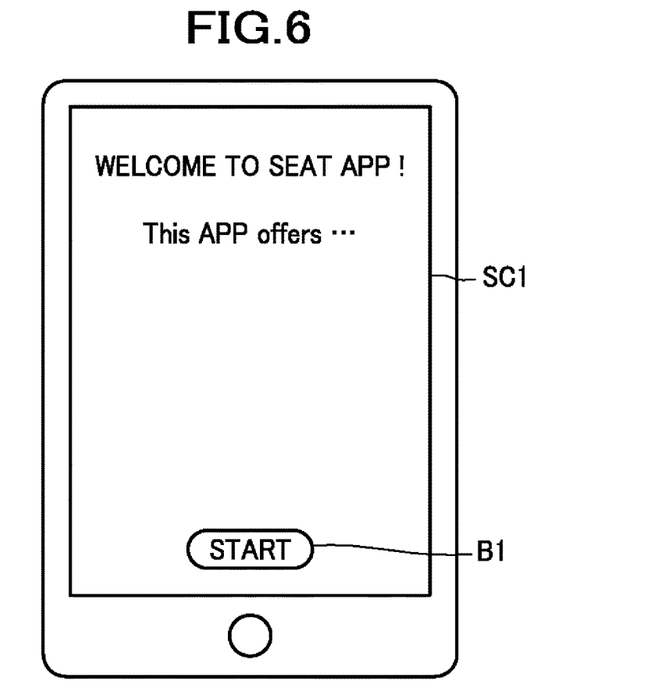
FIG. 6 is a guide screen of an app.

As shown in FIG. 4, upon activation of the functions of the physical state sharable seat S and startup of the application of the smartphone SP, a guide screen SC1 is presented (S101, see FIG. 6). The guide screen SC1 shows a start button B1; if an occupant P presses the start button B1, then the process goes on to step S102.

If the controller 100 receives a signal indicating that the start button B1 has been pressed, then the measurement value acquisition unit 111 acquires a measurement value from each pressure sensor 8 (S102). The measurement value acquisition unit 111 then presents, at the smartphone SP, a measurement-in-progress screen SC2 indicating that measurement is currently in progress, as shown in FIG. 7.

Figure 8:
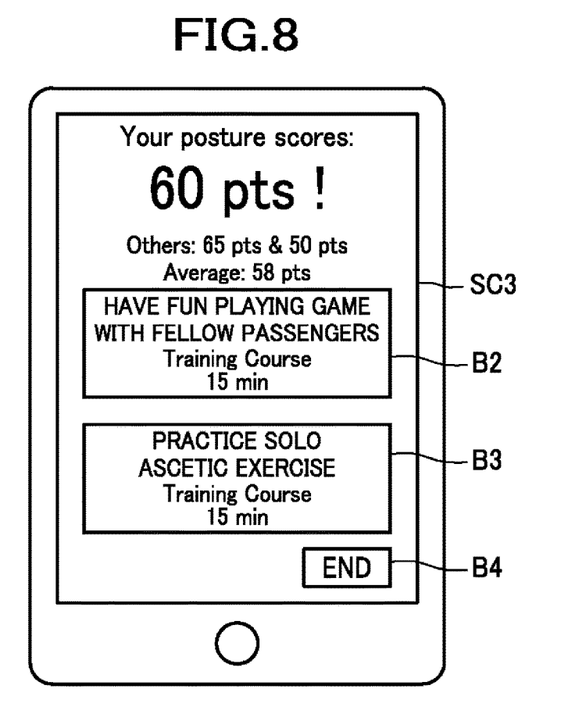
FIG. 8 is a screen on which an evaluation value and a menu of choices of training programs are displayed.

Thereafter, when measurement of predetermined period of time has ended, the evaluation unit 121 computes an evaluation value based upon the measurement values, and the evaluation value presentation unit 122 presents, at the smartphone SP, an evaluation value presentation screen SC3 as shown in FIG. 8 (S103).

Further, the shared data acquisition unit 161 acquires other-occupant evaluation values and a mean value (S104), and the shared data presentation unit 162 presents, on the evaluation value presentation screen SC3 of FIG. 8, the other-occupant evaluation values and the mean value (S105).

In this way, the shared data presentation unit 162 presents the evaluation value and the other-occupant evaluation values in an easy-to-compare manner.

The console image presentation unit 155 presents, on the evaluation value presentation screen SC3, a "Have fun playing game with fellow passengers" training course selection button B2 and a "Practice solo ascetic exercise" training course selection button B3 for selection of training programs, as well as an end button B4 (S105).

Figure 9:
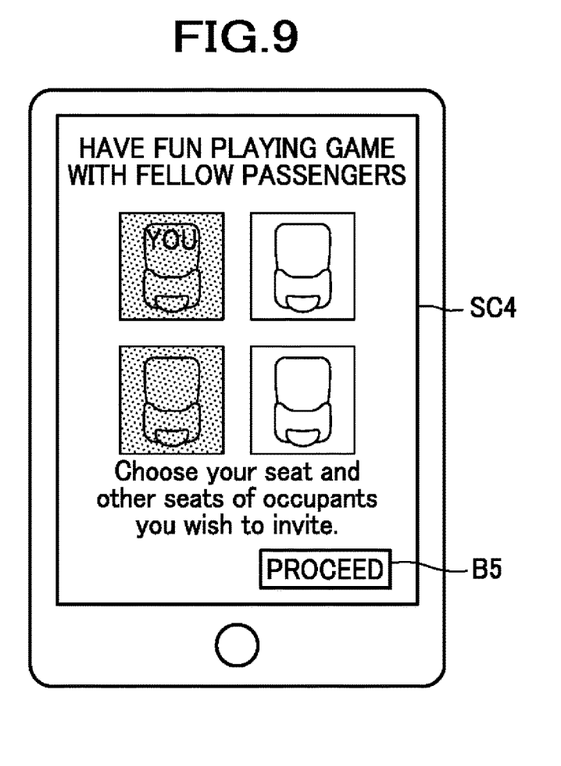
FIG. 9 is a participant choice screen for a training program.

Thereafter, the controller 100 awaits selection of a program until receipt of a relevant signal from the smartphone SP (S110). If the end button B4 is selected by the occupant P, then the process comes to an end. On the other hand, if the "Have fun playing game with fellow passengers" training course or the "Practice solo ascetic exercise" training course is selected, then the console image presentation unit 155 presents an image corresponding to the training program selected. For example, if the "Have fun playing game with fellow passengers" training course is selected, a participant choice screen SC4 which offers available options for participants as shown in FIG. 9 is presented. Prompted by this screen, the occupant P may choose participants, and press a proceed button B5 to advance the process of the controller 100.

Figure 10:
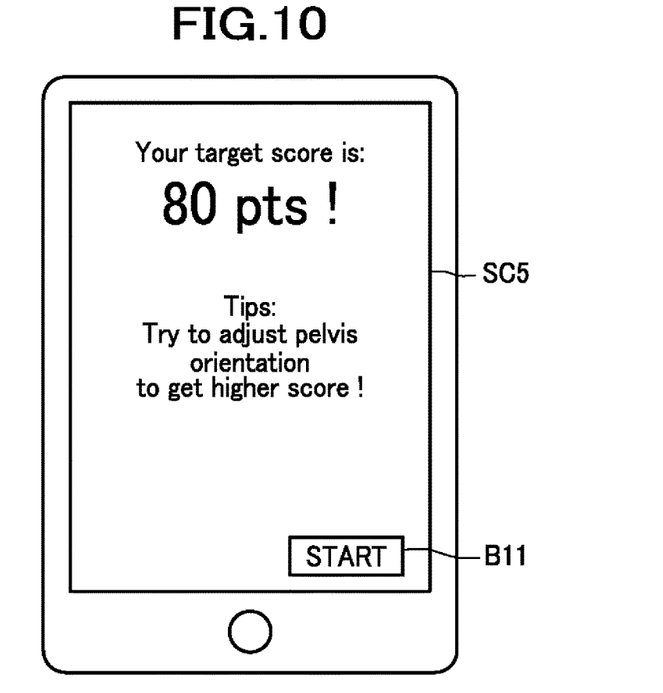
FIG. 10 is a screen showing a target value and a piece of advice.

If the controller 100 receives a signal indicative that the proceed button B5 has been pressed, then the target value assignment unit 131 assigns a target value predetermined for the selected program, and the target value presentation unit 132 presents this target value at the smartphone SP as shown in FIG. 10 (S111, target value presentation screen SC5). The advice presentation unit 151 acquires advice (tips) based upon an evaluation value on the physical state of the occupant P, and presents the tips on the target value presentation screen SC5 (S112).

Upon receipt of a signal indicative that a start button B11 has been pressed, the controller 100 executes the training program (S200).

Figure 5:
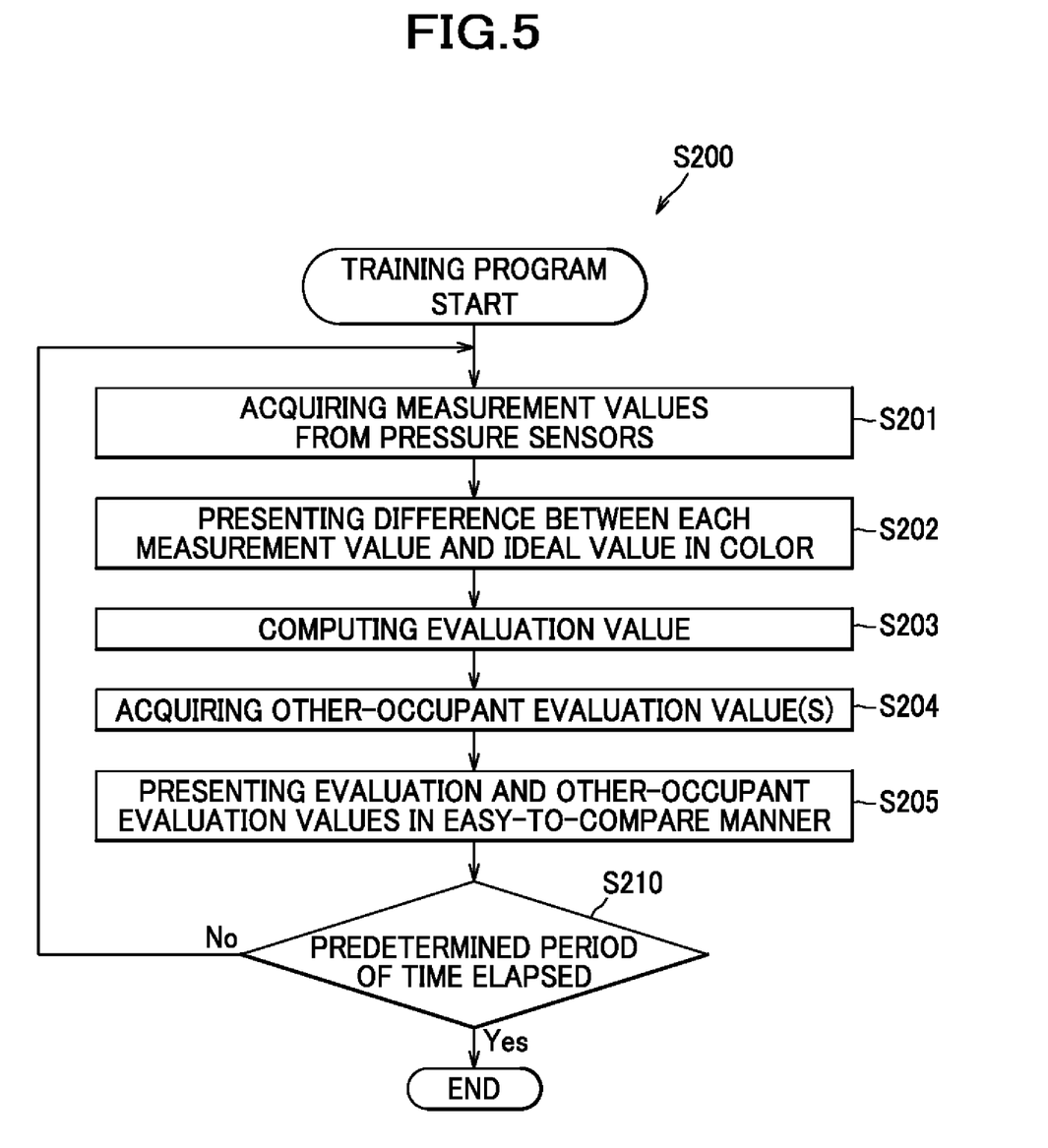
FIG. 5 is a flowchart showing an example of a process of a training program.
Figure 11:
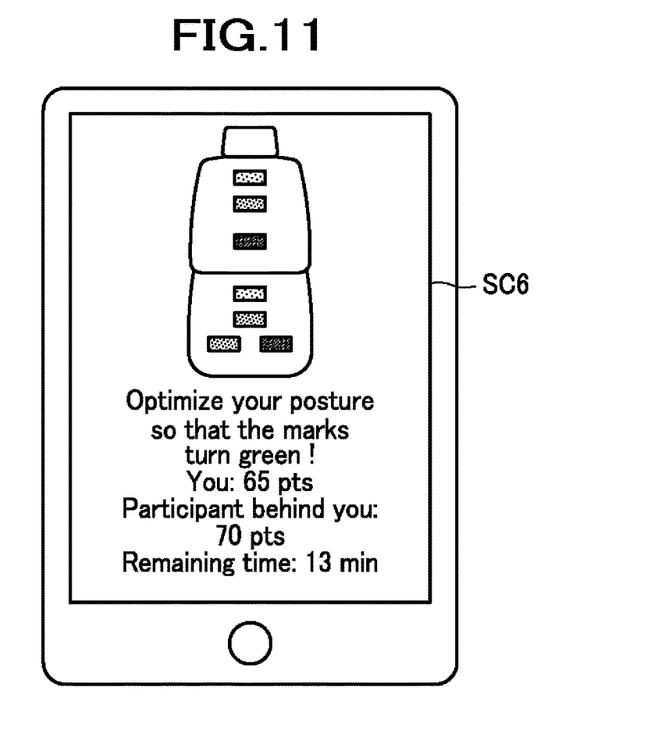
FIG. 11 is a training screen.

For example, as shown in FIG. 5, first, the measurement value acquisition unit 111 acquires measurement values from the pressure sensors 8 (S201), and presents a measurement-in-progress image on a training screen SC6 as shown in FIG. 11. In the measurement-in-progress image, a difference between each measurement value and its ideal value is represented characteristically in color (S202). Then, the evaluation unit 121 computes an evaluation value (S203), and the shared data acquisition unit 161 acquires the other-occupant evaluation value(s) through the ECU 3 (S204). The evaluation value presentation unit 122 presents the current evaluation value on the training screen SC6, and the shared data presentation unit 162 presents the current other-occupant evaluation value(s) on the training screen SC6 (S205). To be more specific, the shared data presentation unit 162 not only presents the other-occupant evaluation value(s) during measurement made by the pressure sensors 8 to acquire the measurement values for the occupant P and computation of the evaluation value performed by the evaluation unit 121, but also presents the other-occupant evaluation value(s) at the smartphone SP to be used by the occupant P during the current evaluation value being presented at the smartphone SP to be used by the occupant P.

The occupant P may try to adjust his/her own posture toward the state in which all the regions corresponding to the pressure sensors 8 in the measurement-in-progress image (seat image) eventually turn green, while checking the training screen SC6, for an effective posture-corrective training.

The training screen SC6 has shown therein a counter of remaining time for training presented by the console image presentation unit 155.

The controller 100 determines whether or not a predetermined period of time has elapsed (S210), and continues the measurement and presentation of S201 to S205 until the predetermined period of time has elapsed (No, S210). If the predetermined period of time has elapsed (Yes, S210), then the training program is brought to an end.

Figure 12:
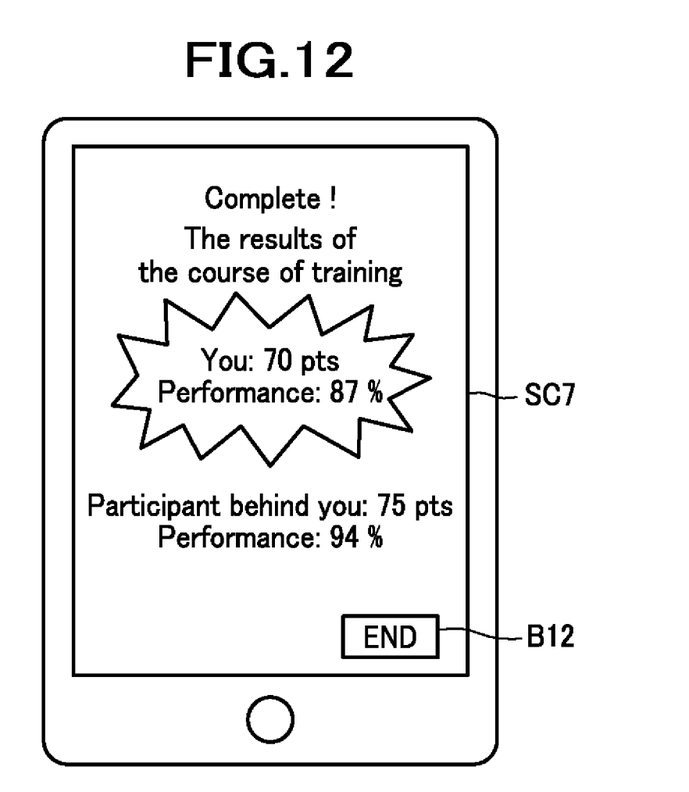
FIG. 12 is a screen showing evaluation values and performance levels after training.

As shown in FIG. 4, after step S200, the measurement value acquisition unit 111 acquires measurement values from the pressure sensors 8 (S121). At this time as well, the measurement value acquisition unit 111 presents the measurement-in-progress screen SC2 as shown in FIG. 7. The evaluation unit 121 then computes an evaluation value based on measurement values obtained after the training and the performance level computation unit 141 computes a level of performance based on the evaluation values before and after the training (S122). The evaluation value presentation unit 122 presents the evaluation value at the smartphone SP; the performance level presentation unit 142 presents the level of performance at the smartphone SP; the shared data acquisition unit 161 acquires other-occupant evaluation value(s) and other-occupant performance level(s) through the ECU 3; and the shared data presentation unit 162 presents the other-occupant evaluation value(s) and the other-occupant performance level(s) at the smartphone SP (S123). Accordingly, a post-training performance level presentation screen SC7, for example, as shown in FIG. 12 is displayed. In the performance level presentation screen SC7, preferably, advice determined based on the evaluation value obtained after completion of the training may be presented by the advice presentation unit 151. If an end button B12 in this screen is pressed by the occupant P, then the application of the smartphone SP and the process of the controller 100 comes to an end.

Incidentally, when prompted by the evaluation value presentation screen SC3, the occupant P may choose, for example, the "Practice solo ascetic exercise" training course, which may proceed without presentation of the participant choice screen SC4 as of FIG. 9 and further proceed with presentation of a training screen SC6 that is similar to one shown in FIG. 11 but fails to include the other-occupant evaluation value(s). Hereupon, a performance level presentation screen SC7 similar to one shown in FIG. 12 may be presented without including the other-occupant performance level(s), and/or with previously computed other-occupant performance level(s) included instead.

With the configurations, as described above, of the physical state sharable seat S and the system SYS according to the present embodiment, the occupant P can be informed of, not only his/her own evaluation value on the physical state, but also the other-occupant evaluation value(s). Accordingly, having been informed, for example, of the other-occupant evaluation value(s) or of the possibility that his/her own evaluation value would be made known to others, motivation for improving the evaluation value, presumably, can be summoned up. In addition, sharing of evaluation values with others should be of fun. Accordingly, the motivation to use the features of evaluating the physical state can be enhanced.

With the physical state sharable seat S and the system SYS according to the present embodiment, not only the occupant's own level of performance for the physical state, but also the other-occupant performance level(s) can be made known. Accordingly, having been informed, for example, of the other-occupant performance level(s) or of the possibility that his/her own level of performance would be let be known to others, motivation for improving the level of his/her performance, presumably, can be summoned up. In addition, sharing of performance levels with others should be of fun. Accordingly, the motivation to use the features of evaluating the physical state can be enhanced.

Moreover, the occupant P can pleasurably get absorbed in increasing the evaluation value on the physical state by making reference to the advice presented at the smartphone SP. Furthermore, the physical state sharable seat S is configured such that the evaluation value and the other-occupant evaluation value(s) are provided in an easy-to-compare representation at the smartphone SP to be used by the occupant P; therefore, the occupant's motivation can be further enhanced.

Also, with this physical state sharable seat S, the mean value of the evaluation and other-occupant evaluation values is made known to the occupant P, with the result that the motivation of the occupant P can further be enhanced.

Although one exemplary embodiment has been described above, the present invention is not limited to the above-described embodiment. Specific configurations may be modified where appropriate without departing from the gist of the invention.

Figure 13:
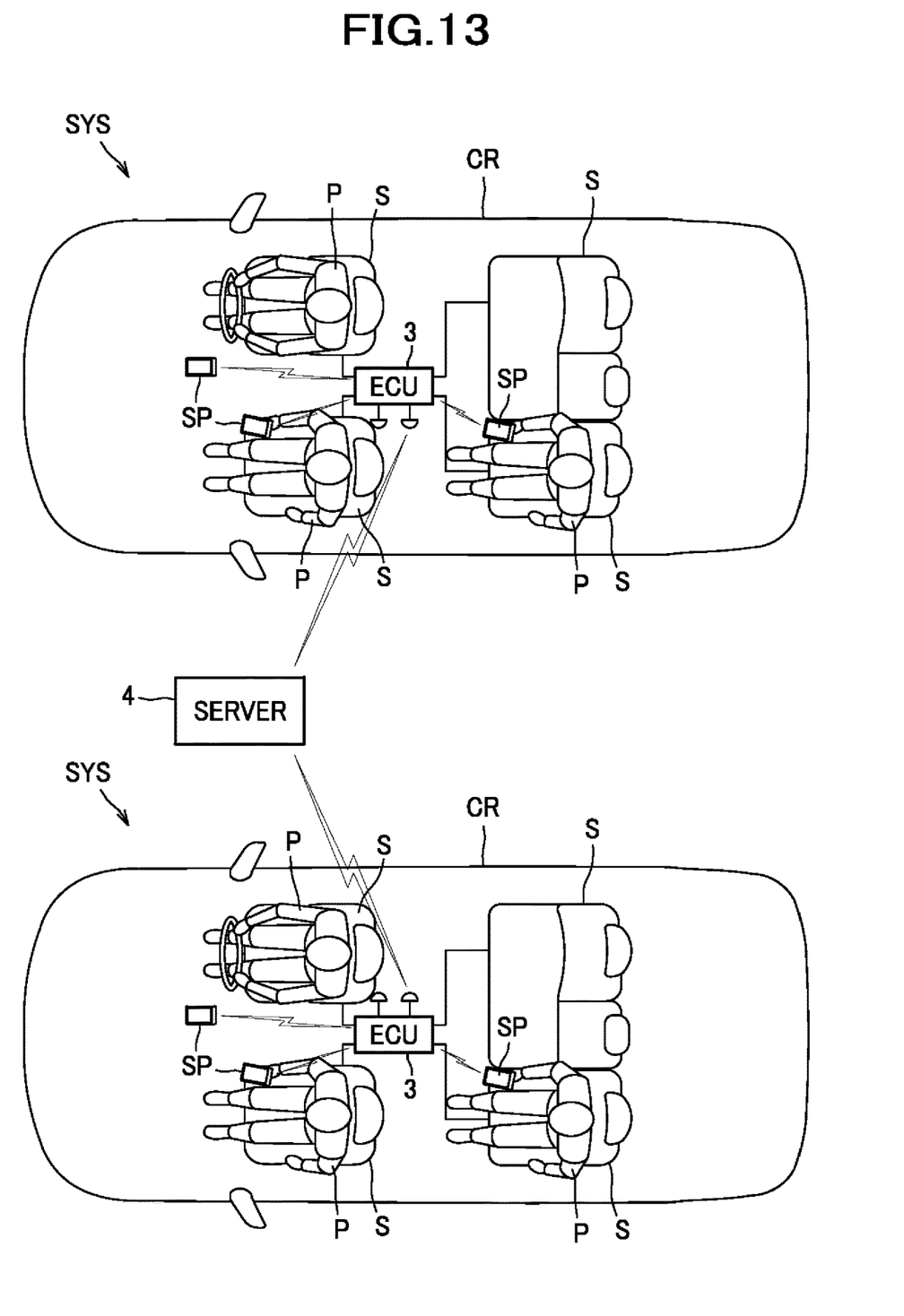
FIG. 13 is a diagram for explaining a general configuration of a system using physical state sharable seats according to another embodiment.
Figure 14:
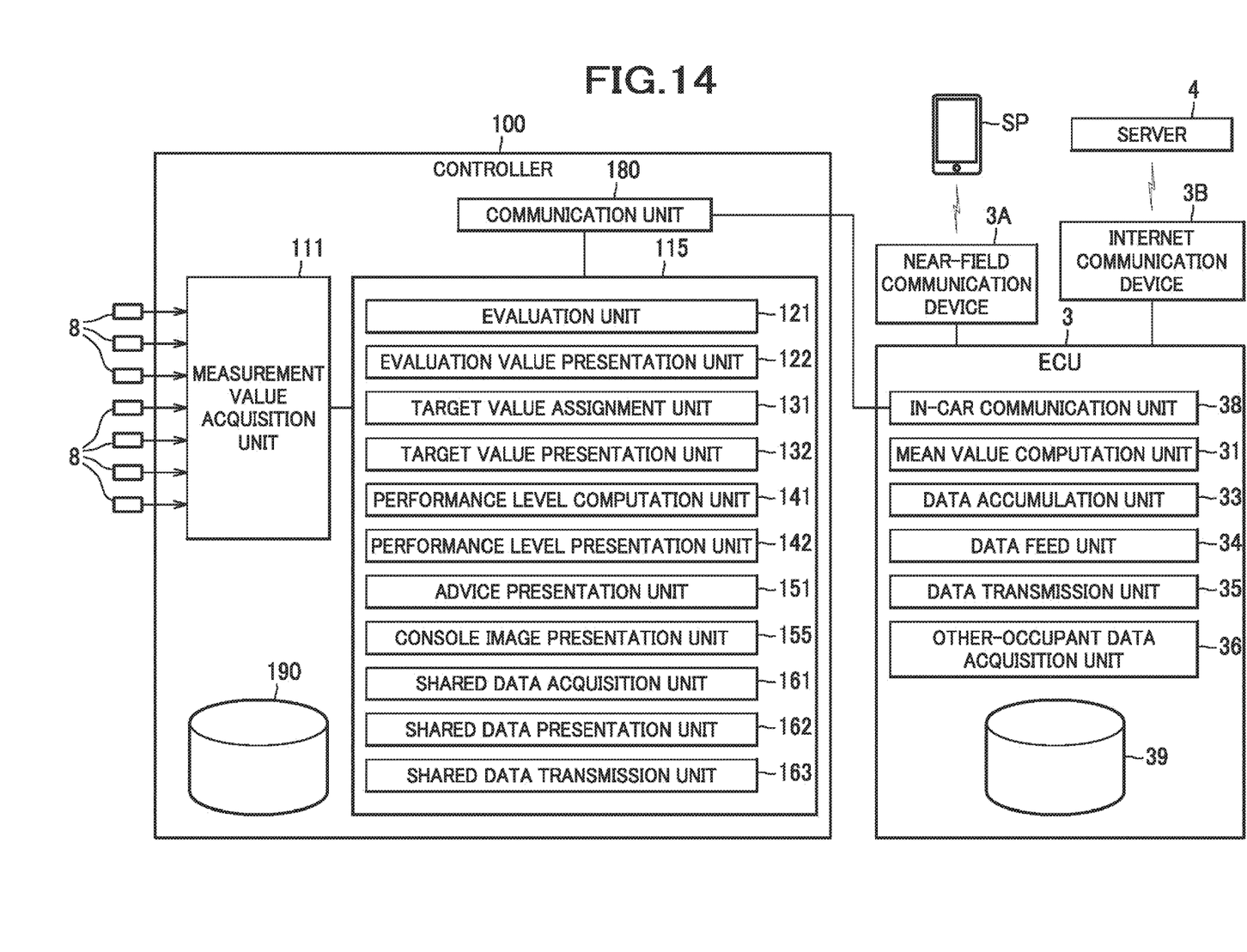
FIG. 14 is a block diagram for explaining a physical state sharable seat and system configuration according to another embodiment.

For example, the physical state sharable seat S and the system SYS may be configured according to another embodiment as shown in FIG. 13, such that physical state information is shared among a plurality of cars CR through a server 4. In this system SYS, the ECU 3 is provided with an internet communication device 3B and is thereby made capable of establishing data communications with the server 4 via the Internet. The ECU 3 further includes a data transmission unit 35 and an other-occupant data acquisition unit 36.

The data transmission unit 35 has a function of transmitting, to the server 4, various data obtained from physical state sharable seats S in the car CR to which it belongs.

The other-occupant data acquisition unit 36 has a function of responding to a request from the physical state sharable seat S and thus acquiring, from the server 4, data on the physical states of other occupant(s), which data have been obtained in the other car(s) CR.

Herein, the shared data acquisition unit 161 of each physical state sharable seat S is configured to acquire the other-occupant evaluation value(s) and/or the other-occupant performance level(s) from the physical state sharable seat(s) S installed in other car(s) CR. To be more specific, the shared data acquisition unit 161 acquires the other-occupant evaluation value(s) and the other-occupant performance level(s) from the server 4 through the ECU 3. With this configuration, the occupant P can be informed of the other-occupant evaluation value(s) and the other-occupant performance level(s), not only of the other occupant(s) seated in the car in which the occupant P is seated, but also of those seated in the other car(s). Presentation, thus given at the smartphone SP to be used by the occupant P, of the other-occupant evaluation value(s) acquired from the other physical state sharable seat(s) S which would be installed in any other car(s) S can be effective in further enhancing the motivation of the occupant P.

In the above-described embodiment, the terminal is exemplified by the smartphone SP, but the terminal may be a terminal equipped in the car CR, instead. It is also to be understood that the screen is not essential; a feasible configuration of the terminal may be such that a microphone and a speaker are provided therein to allow instructions to the physical state sharable seat S to be received by voice and the presentation of information to be made by voice.

In the above-described embodiment, the shared data presentation unit 162 is configured to present the other-occupant evaluation value(s) and, in addition thereto, the other-occupant performance level(s) both at the terminal simultaneously, but may alternatively be configured to present the other-occupant performance level(s) only, without presenting the other-occupant evaluation value(s).

In the above-described embodiment, the physical state sharable seat is exemplified by a seat installed in a car, but may be a seat installed in a vehicle other than a car, or a seat installed at home, in facilities, or at any other places not in a vehicle.

Any of the elements explained in relation to the exemplified embodiments and illustrative modified examples disclosed in this description may be implemented in combination as desired.

The invention claimed is:

1. A physical state sharable seat comprising:
   a seat body;
   a sensor configured to acquire a measurement value specific to a physical state of an occupant seated on the seat body; and
   a controller connected to the sensor and thereby allowed to acquire the measurement value from the sensor, the controller being configured to communicate with other equipment, wherein the controller comprises:
   an evaluation unit configured to compute an evaluation value on the physical state based on the measurement value;
   an evaluation value presentation unit configured to present the evaluation value at a terminal to be used by the occupant;
   a shared data acquisition unit configured to acquire an other-occupant evaluation value that is an evaluation value on a physical state of another person, acquired either by the evaluation unit or from another physical state sharable seat;
   a shared data presentation unit configured to present the other-occupant evaluation value at the terminal to be used by the occupant;
   a target value presentation unit configured to present a target value for the evaluation value at the terminal to be used by the occupant; and
   a performance level computation unit configured to compute a level of performance with respect to the target value based upon an evaluation value computed by the evaluation unit before presentation of the target value and an evaluation value computed by the evaluation unit after presentation of the target value,
   wherein the shared data acquisition unit is further configured to acquire an other-occupant performance level that is a performance level of another person, acquired either by the performance level computation unit or from another physical state sharable seat, and
   wherein the shared data presentation unit is further configured to present the other-occupant performance level instead of the other-occupant evaluation value, or present the other-occupant evaluation value and the other-occupant performance level, at the terminal to be used by the occupant.

2. The physical state sharable seat according to claim 1, wherein the shared data presentation unit is further configured to present the other-occupant evaluation value, before the target value presentation unit presenting the target value, at the terminal to be used by the occupant.

3. The physical state sharable seat according to claim 1, wherein the shared data presentation unit is further configured to present the other-occupant evaluation value, after the performance level computation unit computing the level of performance, at the terminal to be used by the occupant.

4. The physical state sharable seat according to claim 1, wherein the shared data presentation unit is further configured to present the other-occupant evaluation value at the terminal to be used by the occupant during measurement made by the sensor to acquire the measurement value of the occupant and computation of the evaluation value performed by the evaluation unit.

5. The physical state sharable seat according to claim 4, wherein the shared data presentation unit is further configured to present the other-occupant evaluation value at the terminal to be used by the occupant during a current evaluation value being presented at the terminal to be used by the occupant.

6. The physical state sharable seat according to claim 1, wherein the controller comprises an advice presentation unit configured to acquire, and present at the terminal to be used by the occupant, advice about how to increase the evaluation value based on the evaluation value.

7. The physical state sharable seat according to claim 1, wherein the controller is further configured to cause the evaluation value presentation unit and the shared data presentation unit to present the evaluation value and the other-occupant evaluation value in an easy-to-compare manner at the terminal to be used by the occupant.

8. The physical state sharable seat according to claim 1, wherein the seat body is installable in a car, and
wherein the shared data acquisition unit is further configured to acquire the other-occupant evaluation value from a physical state sharable seat installed in another car.

9. The physical state sharable seat according to claim 1, wherein the seat body is installable in a car, and
wherein the shared data acquisition unit is further configured to acquire a mean value of the evaluation and other-occupant evaluation values of a plurality of physical state sharable seats in the car, and
wherein the shared data presentation unit is further configured to present the mean value at the terminal to be used by the occupant.

* * * * *